(12) United States Patent
Royer

(10) Patent No.: US 7,177,983 B2
(45) Date of Patent: Feb. 13, 2007

(54) MANAGING DIRTY EVICTS FROM A CACHE

(75) Inventor: Robert J. Royer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 328 days.

(21) Appl. No.: 10/640,218

(22) Filed: Aug. 12, 2003

(65) Prior Publication Data

US 2005/0038963 A1  Feb. 17, 2005

(51) Int. Cl.
*G06F 13/00* (2006.01)
*G06F 12/00* (2006.01)

(52) U.S. Cl. ............... 711/133; 711/103; 711/113; 711/128; 711/135; 711/144; 711/170; 714/24

(58) Field of Classification Search ........... 711/103, 711/113, 133, 135, 144, 170, 128, 134, 145, 711/156, 159, 173; 714/24; 713/320, 323, 713/324
See application file for complete search history.

(56) References Cited

U.S. PATENT DOCUMENTS

| | | | | |
|---|---|---|---|---|
| 5,390,318 | A * | 2/1995 | Ramakrishnan et al. | 711/158 |
| 6,032,227 | A * | 2/2000 | Shaheen et al. | 711/129 |
| 6,078,992 | A * | 6/2000 | Hum | 711/122 |
| 6,292,868 | B1 * | 9/2001 | Norman | 711/103 |
| 6,434,666 | B1 * | 8/2002 | Takahashi et al. | 711/119 |
| 6,748,492 | B1 * | 6/2004 | Rowlands et al. | 711/128 |
| 6,934,812 | B1 * | 8/2005 | Robbin et al. | 711/138 |
| 6,961,814 | B1 * | 11/2005 | Thelin et al. | 711/113 |
| 2004/0088481 | A1 * | 5/2004 | Garney | 711/113 |
| 2004/0107318 | A1 * | 6/2004 | Bono et al. | 711/118 |
| 2005/0055528 | A1 * | 3/2005 | Arimilli et al. | 711/203 |

* cited by examiner

*Primary Examiner*—Hong Kim
(74) *Attorney, Agent, or Firm*—Sanjay S. Gadkari

(57) ABSTRACT

In a Constant Access Time Bounded (CATB) cache, if a dirty line in a search group of the cache is selected for eviction from the cache, marking the dirty line as evicted, selecting a replacement line from a reserve, and inserting the replacement line into the search group.

18 Claims, 5 Drawing Sheets

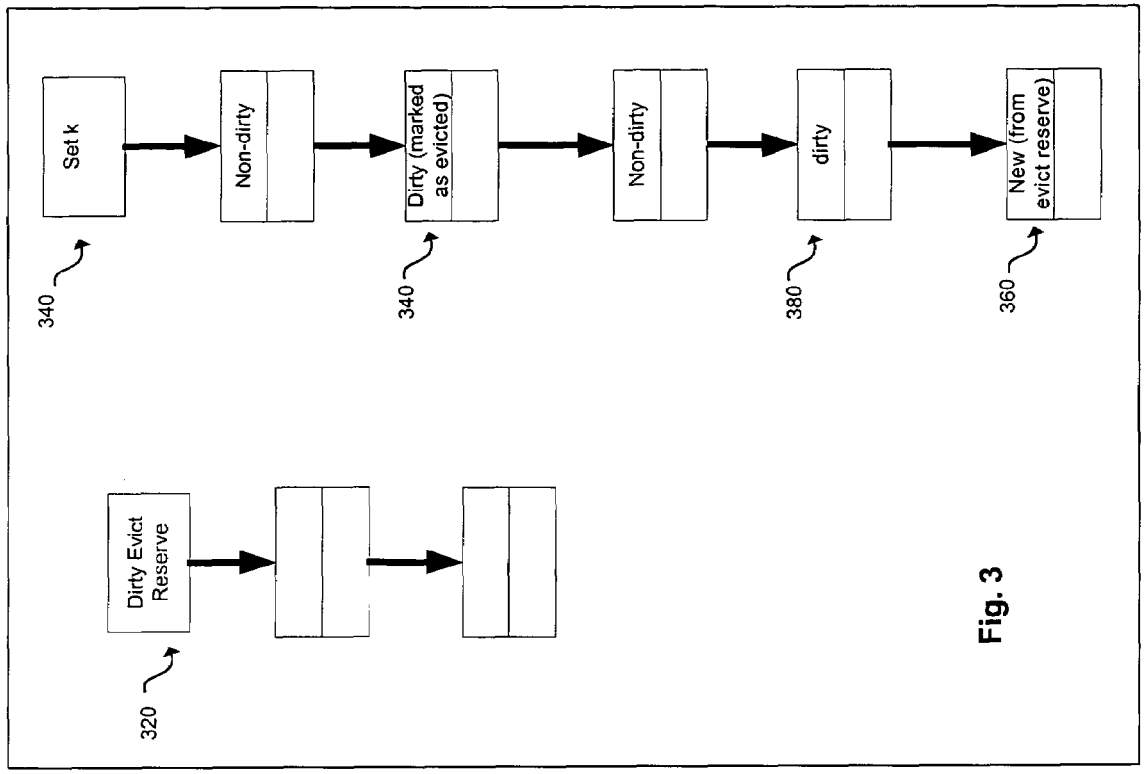
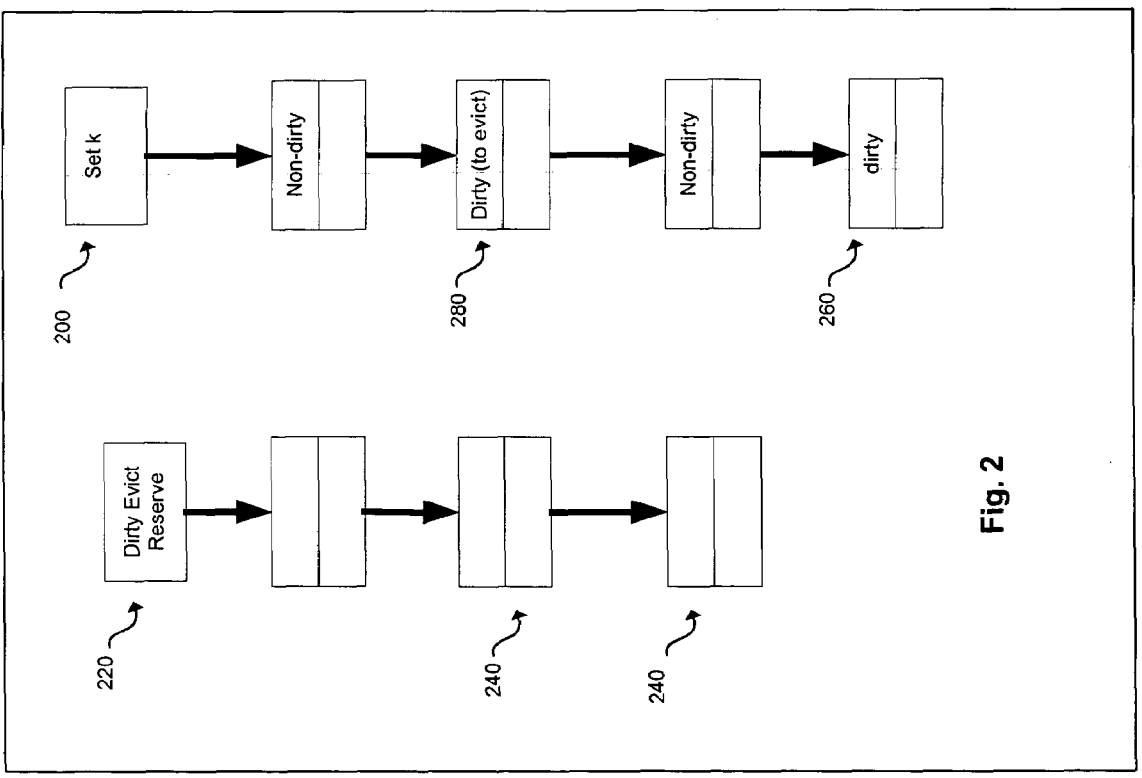
Fig. 3
Fig. 2

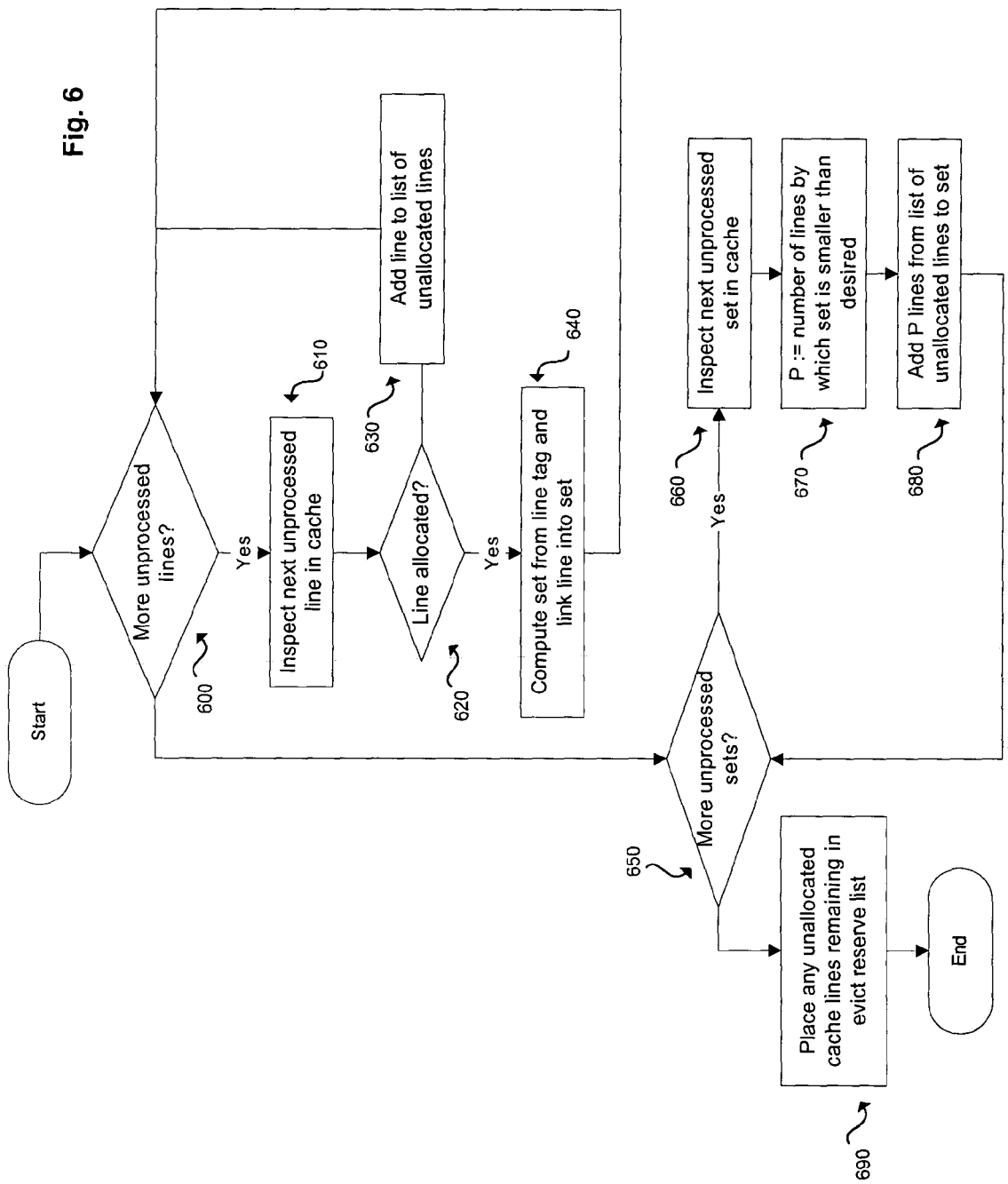

MANAGING DIRTY EVICTS FROM A CACHE

BACKGROUND

Caching is a well-known technique that uses a smaller, faster storage device to speed up access to data stored in a larger, slower storage device. A typical application of caching is found in disk access technology. A processor based system accessing data on a hard disk drive, for example, may achieve improved performance if a cache implemented in solid state memory that has a lower access time than the drive is interposed between the drive and the processor. As is well known to those skilled in the art, such a cache is populated by data from the disk that is accessed by the system and subsequent accesses to the same data can then be made to the cache instead of to the disk, thereby speeding up performance. The use of caching imposes certain constraints on the design of a system, such as a requirement of cache consistency with the main storage device, e.g. when data is written to the cache, as well as performance based constraints which dictate, e.g. what parts of the cache are to be replaced when a data access is made to a data element that is not in the cache and the cache happens to be full (cache replacement policy).

A well known design for caches, specifically for disk caches, is an N-way set associative cache, where N is some non-zero whole number. In such a design, the cache may be implemented as a collection of N arrays of cache lines, each array representing a set, each set in turn having as members only such data elements, or, simply, elements, from the disk whose addresses map to a set based on an easily computed mapping function. Thus, in the case of a disk cache, any element on a disk can be quickly mapped to a set in the cache by, for example, obtaining the integer value resulting from performing a modulus of the address of the element on disk, that is, its tag, with the number of sets, N, in the cache (the tag MOD N) the result being a number that uniquely maps the element to a set. Many other methods may be employed to map a line to a set in a cache, including bit shifting of the tag, or any other unique set of bits associated with the line, to obtain an index for a set; performing a logical AND between the tag or other unique identifier and a mask; XOR-ing the tag or other unique identifier with a mask to derive a set number, among others well known to those skilled in the art, and the claimed subject matter is not limited to any one or more of these methods.

To locate an element in a set associative cache, the system uses the address of the data on the disk to compute the set in which the element would reside, and then in a typical implementation searches through the array representing the set until a match is found, or it is determined that the element is not in the set.

A similar implementation of a cache may use a hash table instead of associative sets to organize a cache. In such a cache, once again, elements are organized into fixed size arrays, usually of equal sizes. However, in this instance, a hashing function is used to compute the array (termed a hash bucket) within which an element is located. The input to the hashing function may be based on the element's tag and the function then maps the element to a particular hash bucket. Hashing functions and their uses for accessing data and cache organization are well known and are not discussed here in detail.

To simplify the exposition of the subject matter in this application, the term Constant Access Time Bounded (CATB) is introduced to describe cache designs including the set associative and hash table based caches described above. A key feature of CATB caches in the art is that they are organized into fixed sized arrays, generally of equal size, each of which is addressable in constant time based on some unique aspect of a cache element such as its tag. Other designs for CATB caches may be readily apparent to one skilled in the art. In general the access time to locate an element in a CATB cache is bounded by a constant, or at least is independent of the total cache size, because the time to identify an array is constant and each array is of a fixed size, and so searching within the array is bounded by a constant. For uniformity of terminology, the term search group is used to refer to the array (i.e. the set in a set associative cache or the hash bucket in the hash table based cache) that is identified by mapping an element.

Each element in a CATB cache, or cache line, contains both the actual data from the slower storage device that is being accessed by the system as well as some other data termed metadata that is used by the cache management system for administrative purposes. The metadata may include a tag i.e. the unique identifier or address for the data in the line, and other data relating to the state of the line including a bit or flag to indicate if the line is in use (allocated) or not in use (unallocated), as well as bits reserved for other purposes.

Typically, caches are used for both reading and writing data. Generally there are two types of policies that caches may use for writing data to a location that is in the cache. One is termed a write through policy and the other a write-back policy. In a write through cache, data modified at a location that is in a cache is also immediately written to the main storage device, such as a disk. This ensures consistency between the main storage device and the cache, but may impose a performance penalty, because writing to the main storage device is usually significantly slower than writing to the cache. A write-back cache, however, does not immediately write data that is modified in the cache back to the main storage device. Rather, the cache management system waits until an appropriate time to write the data back to the main storage device, such as when the system is idle. During the time between the modification of data in the cache and time the data is written back to main storage, the cache line with the modified data is not consistent with the corresponding location in main storage and is said to be dirty.

A problem arises when in the course of the operation of the cache, a cache line that the cache replacement policy chooses for eviction from the cache also happens to be dirty. After the data in the cache line is evicted, in a typical cache, the cache line is overwritten by new data. To ensure consistency with main storage, therefore, the modified data in the dirty cache line chosen for eviction may have to be written back to main storage before the line can be evicted. This generally produces an undesirable performance penalty for the system at a time when the system is not idling. Alternatively, in systems where power consumption is an issue, a write-back may cause additional power consumption if a disk drive needs to be spun up from a low power consuming state in order to accomplish the write to the disk. This problem is termed the dirty evict problem.

BRIEF DESCRIPTION OF THE DRAWINGS

FIG. 2 depicts the cache of FIG. 1 in a state where a dirty cache line has been selected for eviction in this embodiment of the claimed subject matter.

FIG. 3 depicts the cache of FIG. 2 in a state where the cache line has been marked as evicted and a new line has been added to the set from a dirty evict reserve to replace the evicted line in this embodiment of the claimed subject matter.

FIG. 6 depicts a second flowchart depicting processing in an embodiment of the claimed subject matter.

DETAILED DESCRIPTION

Figure 1:
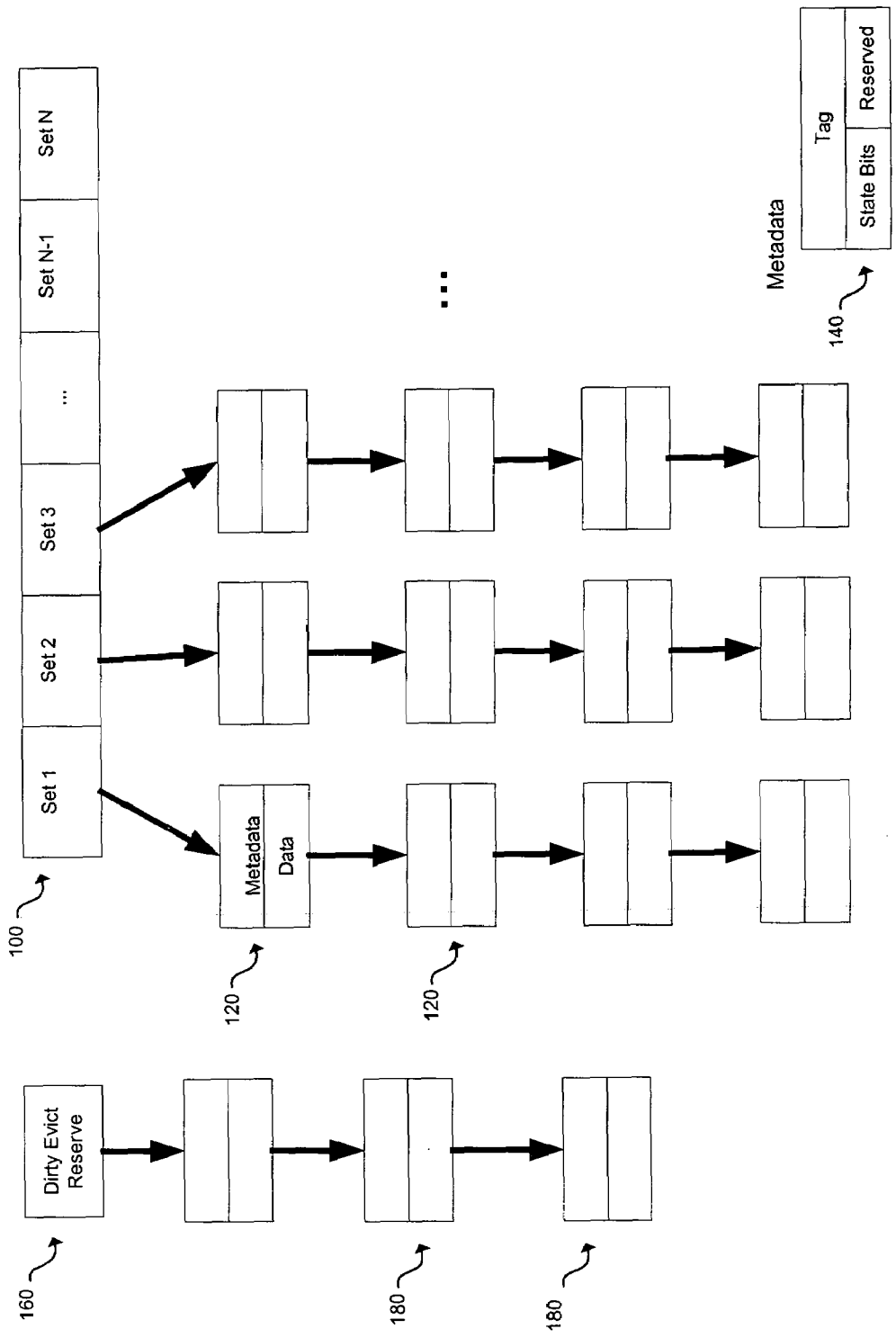
FIG. 1 depicts a data structure that may be used to implement an N-way set associative cache in an embodiment of the claimed subject matter.

In one embodiment of the claimed subject matter, a non-volatile memory unit is used to implement a disk cache with a portion of the cache reserved to replace lines containing dirty evicted data as shown in FIG. 1. In the figure, a portion of the unallocated cache line, termed the dirty evict reserve 160, is reserved for use when a dirty line is evicted from the cache. The lines in this reserve are placed in a linked list as shown, 180. The remaining cache lines 120 are allocated to N sets 100 to form a set associative cache using an array of linked lists, in this embodiment. In other embodiments in accordance with the claimed subject matter, a cache may be implemented in a volatile store unlike the embodiment discussed above. The cache may, in yet other embodiments, serve as a cache for purposes other than disk cache, e.g. a networked data or database cache. The actual organization of the sets of the cache may also differ from that shown in the figure in some embodiments of the claimed subject matter. For example, the sets in the cache may or may not be of exactly equal sizes. In some embodiments of the claimed subject matter, a different basic data structure such as a hash table or other structure suitable for CATB caches may be used. Other terms such as 'elements' or 'storage elements' or 'entries' may be used to describe cache lines in other embodiments. These alternative embodiments are discussed to illustrate the many possible forms that an embodiment in accordance with the claimed subject matter may take and are not intended to limit the claimed subject matter only to the discussed embodiments.

Figure 7:
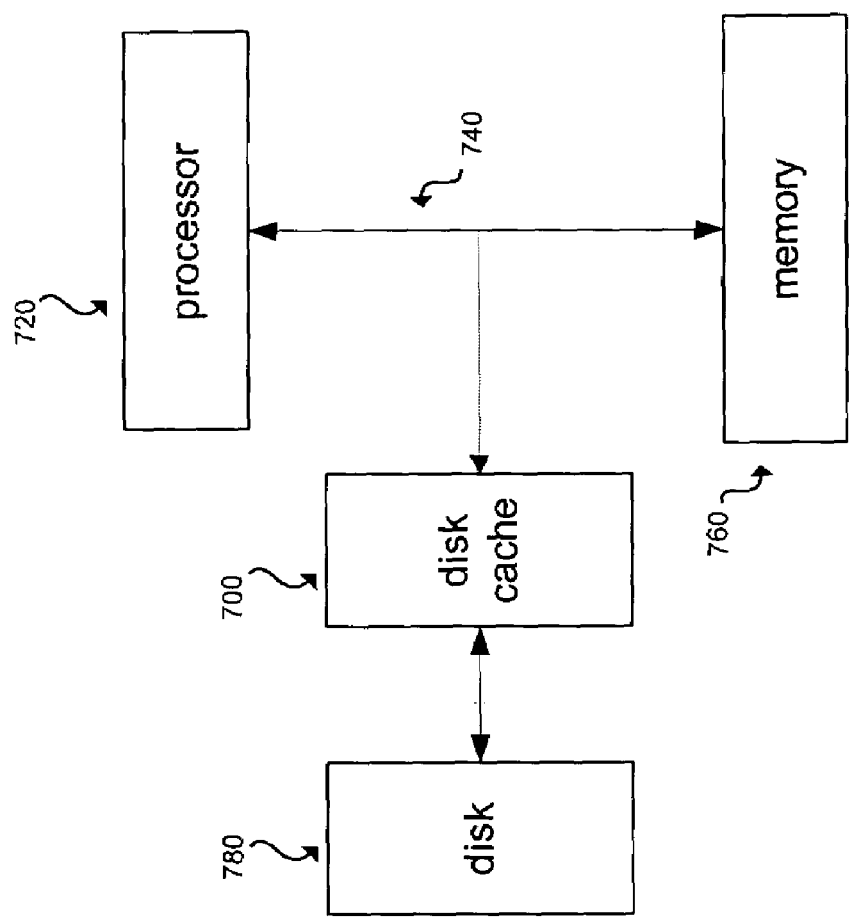
FIG. 7 depicts a processor based system in accordance with one embodiment of the claimed subject matter.

A processor based system such as the one depicted in FIG. 7 implements one exemplary embodiment of the claimed subject matter. The figure shows a processor 720 connected via a bus system 740 to a memory 760 and a disk and cache system including a disk 780 and a disk cache 700. In this implementation, the disk cache 700 may be implemented in volatile or in non-volatile memory. The processor may execute programs and access data, causing data to be read and written to disk 780 and consequently cached in disk cache 700. The system of FIG. 7 is of course merely representative. Many other variations on a processor based system are possible including variations in processor number, bus organization, memory organization, and number and types of disks. Furthermore, the claimed subject matter is not restricted to process based systems in particular, but may be extended to caches in general as described in the claims.

FIG. 2 depicts a snapshot of the cache of FIG. 1 during its operation. To simplify the figure, one of the N sets, numbered k, is depicted. The operation of other sets in the cache in this embodiment is similar. At this point in its operation, a number of lines 260, 280 in this set have become "dirty" because a process has written data to these lines but the data has not yet been written out to the disk. Some of the dirty lines, 280, have been selected for eviction by a cache eviction algorithm. As in the previous figure, a number of unallocated lines 240 is available in the dirty evict reserve, implemented as a linked list in this embodiment of the claimed subject matter.

In FIG. 3, a cache management system responds to the selection of lines such as 340 in set k that are dirty and to be evicted by marking such lines as evicted. The lines are not, however, actually evicted at this stage. Instead, as shown at 360, a new line is added to the set from the dirty evict reserve to allow continued operation of the set-associative cache of this embodiment with the same number of elements available in set k as were available before line 340 was marked for eviction. So, in one instance, if the line 340 were marked as evicted because new data was to be added to set k, the new data would be added, but into line 360 instead of into line 340. As such, this allows the cache to continue operation at the same level of performance as it had before the eviction. Further, the fact that the evicted line is still in the correct set for its tag means that cache integrity with respect to the data in the evicted line is preserved. This in turn implies that the evicted line need not be written back to disk immediately, and integrity will still be preserved. Other lines in the set that are dirty but are not yet to be evicted such as 380, of course, may also remain in the cache as before for normal operation.

Figure 5:
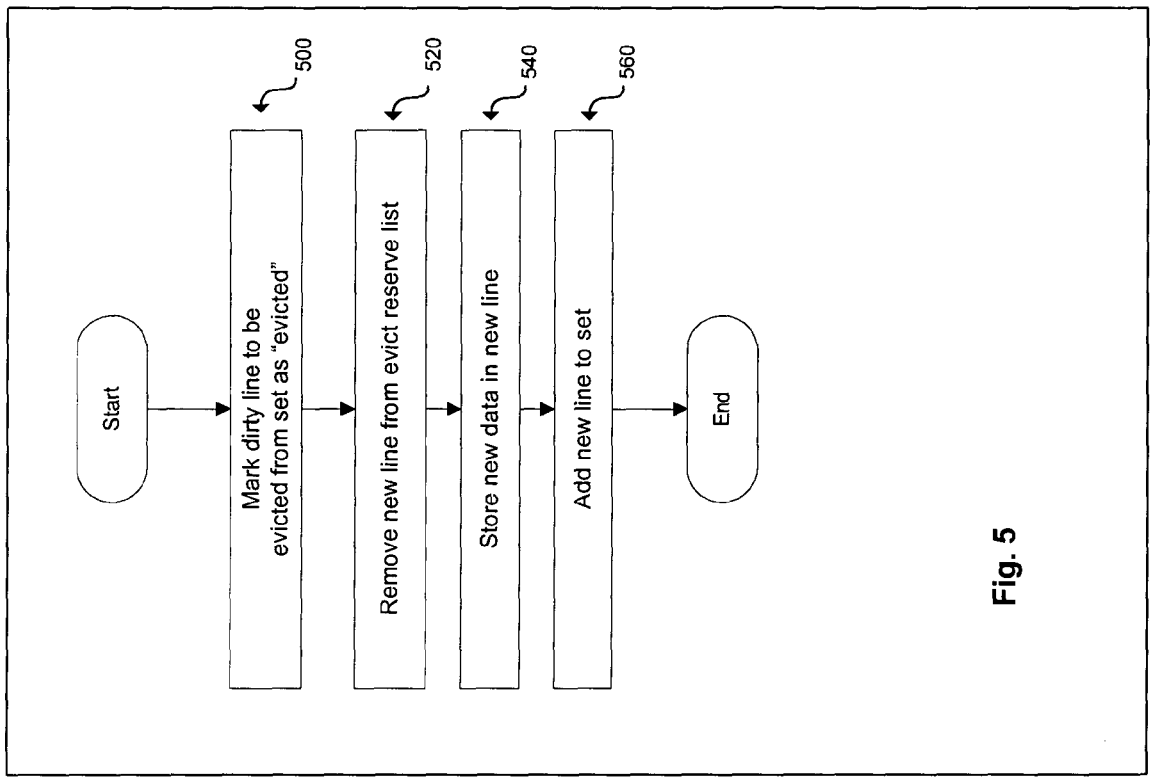
FIG. 5 depicts a first flowchart depicting processing in an embodiment of the claimed subject matter.

FIG. 5 depicts steps in the processing that is pictorially depicted in FIG. 3. In FIG. 5, the starting point is a state where the cache management system has determined that a dirty line is to be evicted, and a new line of data is to be inserted in its place. In processing in an embodiment in accordance with the claimed subject matter, the dirty line that is to be evicted is marked as evicted, but is not removed from the set, 500. Instead, a new line is removed from an evict reserve 520 and any new data that is to be inserted into the set is stored in the new line 540. The new line is then added to the set, 560.

Figure 4:
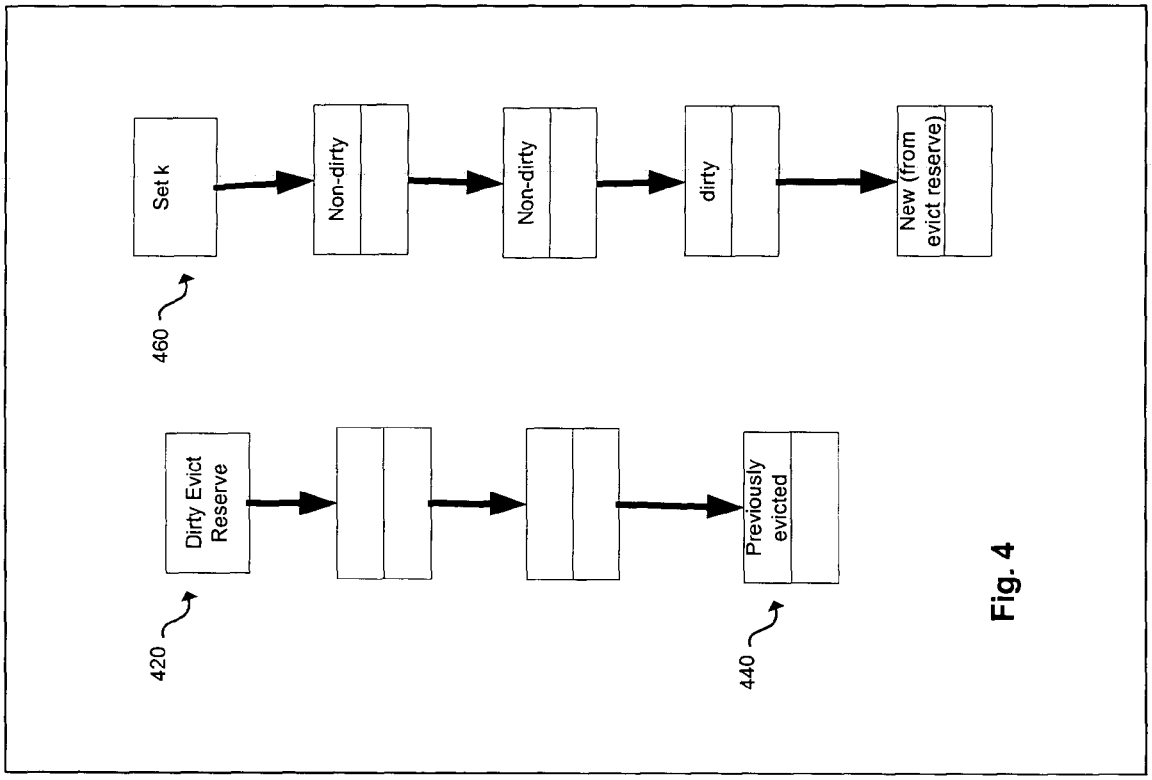
FIG. 4 depicts the cache of FIG. 3 in a state following write-back of the evicted line showing the line that previously contained the dirty evicted data returned to the dirty evict reserve in this embodiment of the claimed subject matter.

FIG. 4 shows the cache and specifically set k after the cache management system in this embodiment has determined that it may write the evicted data back to disk. The system may do this based on several criteria. First, if performance is critical, the system may wait to do a write-back until the processor based system of the embodiment is idle, so that write-back does not impact other activities of the system. Alternatively, the cache management system may wait to piggyback the write-back on the tail end of some other disk write operation before the disk is idled, thus preventing power-consuming spin-ups of the hard drive in an embodiment of the claimed subject matter implemented in a power-critical application such as in a battery powered notebook computer or PDA. The choice of the time at which write-backs of dirty evicted data may be made based on these and other factors depending on the application. A discussion of such factors is outside the scope of this application. The key point is that write-backs resulting from dirty evicts may be managed as described above and delayed until an appropriate opportunity for a write-back presents itself.

As before this description of the operation of a cache embodying the claimed subject matter is not limiting. Many other embodiments are possible. For one example, data structures other than linked lists may be used to store the cache lines available in the dirty evict reserve. While in this embodiment the non-evicted lines across the sets appear to stay equal, other embodiments may not maintain exact equality of the number of non-evicted lines across sets of the cache. These alternative embodiments are discussed to illustrate the many possible forms that an embodiment in accordance with the claimed subject matter may take and are not intended to limit the claimed subject matter only to the discussed embodiments.

In implementations in some embodiments in accordance with the claimed subject matter, a set associative cache with a reserved list for the replacement of evicted lines may be implemented in non-volatile memory, i.e. in a device that retains its data integrity after external power to the device is shut off as may happen if a system is shut down or in a power failure. This may include, in one exemplary embodiment, a cache implemented with non-volatile memory as a disk cache. In such an implementation, it may be possible to recover the state of the cache following a power-down event after power is restored. The addition of a reserved group of cache lines for dirty evicted data as described above does not impact such a recovery. FIG. 5 is a flowchart of a process that might be used to accomplish a recovery in an implementation of this nature.

In FIG. 6, a recovery process as implemented in one embodiment of the claimed subject matter is shown. The process first inspects each line in the non-volatile cache, 600–640. As long as there are more lines to inspect, 600, the process inspects the next line 610. If the line has metadata in which the status information indicates that the line is allocated, i.e. contains valid cached data, it is inserted into the set identified by computing the set's identifier from the tag of the line, 640. If the line is unallocated, it may be added to a pool of unallocated lines in some manner, 630. When all lines are processed, the recovery then enters a second phase, in which each set formed in the first phase of the recovery in a second phase is inspected, 650–690. As long as there are more unprocessed sets 650, the next unprocessed set is inspected. For each set that has less than a target number of lines, the recovery procedure adds lines from the pool of unallocated lines to the set to maintain a balanced number of lines across all sets, 670, 680. Any remaining lines are returned to the reserve, 690. Note that at the end of the process, all sets contain the same lines with the same metadata as they did before the power loss, including lines marked as dirty and/or evicted.

Many other embodiments in accordance with the claimed subject matter relating to this recovery process are possible. For example, in some embodiments, the sets produced by the reconstruction process may not be exactly balanced. In others, the process of allocating allocated lines to sets may differ. These alternative embodiments are discussed to illustrate the many possible forms that an embodiment in accordance with the claimed subject matter may take and are not intended to limit the claimed subject matter only to the discussed embodiments.

Embodiments in accordance with the claimed subject matter include various steps. The steps in these embodiments may be performed by hardware devices, or may be embodied in machine-executable instructions, which may be used to cause a general-purpose or special-purpose processor or logic circuits programmed with the instructions to perform the steps. Alternatively, the steps may be performed by a combination of hardware and software. Embodiments in accordance with the claimed subject matter may be provided as a computer program product that may include a machine-readable medium having stored thereon data which when accessed by a machine may cause the machine to perform a process according to the claimed subject matter. The machine-readable medium may include, but is not limited to, floppy diskettes, optical disks, DVD-ROM disks, DVD-RAM disks, DVD-RW disks, DVD+RW disks, CD-R disks, CD-RW disks, CD-ROM disks, and magneto-optical disks, ROMs, RAMs, EPROMs, EEPROMs, magnet or optical cards, flash memory, or other type of media/machine-readable medium suitable for storing electronic instructions. Moreover, embodiments of the claimed subject matter may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form but steps can be added to or deleted from any of the methods and information can be added or subtracted from any of the described messages without departing from the basic scope of the claimed subject matter. It will be apparent to those skilled in the art that many further modifications and adaptations can be made. The particular embodiments are not provided to limit the invention but to illustrate it. The scope of the claimed subject matter is not to be determined by the specific examples provided above but only by the claims below

What is claimed is:

1. In a Constant Access Time Bounded (CATB) cache, wherein each line of the cache is stored in non-volatile memory, a method comprising:
   if a dirty line in a search group of the cache is selected for eviction from the cache,
   marking the dirty line as evicted;
   selecting a replacement line from a reserve of cache lines; and,
   inserting the replacement line into the search group;
   if the eviction is to enable the insertion of new data, storing the new data in the replacement line; and
   recovering the organization of the cache on power up following a loss of power to the cache by, for each line in the cache, determining if the line is allocated; and
   if the line is allocated, inserting the line in a search group of the cache; and
   if the line is not allocated, inserting the line into a reserve of cache lines.

2. The method of claim 1 further comprising:
   traversing a set in the cache to find lines marked as evicted; and
   for each line found, performing an eviction of the line.

3. The method of claim 2, wherein performing an eviction of the line comprises
   if the line is marked as dirty, writing back data from the line to disk;
   marking the line as unallocated; and,
   inserting the line into a reserve of cache lines.

4. The method of claim 3 wherein the cache is a disk cache caching data from a disk in a processor based system.

5. The method of claim 4 further comprising maintaining the disk in a low power state until writing back data from a line to disk.

6. The method of claim 3 whererin:
   the CATB cache is implemented as a set-associative cache;
   each search group of the cache is a set of the cache; and inserting a line into a search group of the cache further comprises:
    using the address of the data as the tag of the line;
    performing a modulus operation between the tag and the number of sets (N) in the cache (the tag MOD N) to map the tag to a set of the cache;
    performing a search based on the tag of the line; and
    inserting the line into a dynamic data structure that represents the set.

7. The method of claim 6 further comprising:
recovering the organization of the cache on power up following a loss of power to the cache by, for each line in the cache
    determining if the line is allocated;
    if the line is allocated, inserting the line into a dynamic data structure representing a set of the cache using a mapping based on the tag associated with the line; and
    if the line is not allocated, inserting the line into a reserve of cache lines.

8. For a whole number N, in an N-way set associative non-volatile disk cache, a method comprising:
    reserving a predetermined number of cache lines to create a reserve of cache lines;
    distributing the remaining lines in the cache into N dynamic data structures of approximately the same size;
    if a dirty line in a set of the cache is selected for eviction from the cache, marking the dirty line as evicted by modifying metadata associated with the line;
    selecting a replacement line from the reserve of cache lines;
    if the eviction is to enable insertion of new data, storing the new data in the replacement line; and
    inserting the replacement line to a dynamic data structure representing the set;
    recovering the organization of the cache on power up following a loss of power to the cache by for each line in the cache
        determining if the line is allocated;
        if the line is allocated, inserting the line in a set of the cache using a mapping based on the tag associated with the line; and
        if the line is not allocated, inserting the line into a dynamic data structure of unallocated lines.

9. An apparatus comprising:
    an N-way set associative cache implemented in non-volatile memory;
    if a dirty line in a search group of the cache is selected for eviction from the cache, a dirty line eviction module to
        mark the dirty line as evicted;
        select a replacement line from a reserve of cache lines;
        if the eviction is to enable the insertion of new data, store the new data in the replacement line; and
        insert the replacement line into the search group;
    a power source to provide power to the cache; and
    a recovery module to recover the organization of the cache on power up following a loss of power to the cache from the power source by, for each line in the cache determining if the line is allocated;
        if the line is allocated, inserting the line in a set of the cache using a mapping based on the tag associated with the line; and
        if the line is not allocated, inserting the line into a list of unallocated lines.

10. A system comprising
    a processor;
    a disk communicatively coupled to the processor;
    an N-way set associative cache for data from the disk implemented in non-volatile flash memory communicatively coupled to the processor;
    a reserve in the flash memory to store replacement lines;
    a dirty line eviction module to, if a dirty line in a set of the cache is selected for eviction from the cache,
        mark the dirty line as evicted;
        select a replacement line from the reserve of cache lines;
        if the eviction is to enable the insertion of new data, store the new data in the replacement line; and
        insert the replacement line into the search group;
    a power source to provide power to the cache; and
    a recovery module to recover the organization of the cache on power up following a loss of power to the cache from the power source by, for each line in the cache determining if the line is allocated:
        if the line is allocated, inserting the line in a set of the cache using a mapping based on the tag associated with the line; and
        if the in the line is not allocated, inserting the line into the reserve.

11. A tangible machine-readable medium having stored thereon data that when accessed by a machine causes the machine to perform, in a Constant Access Time Bounded (CATB) cache, wherein each line of the cache is stored in non-volatile memory, a method comprising:
    if a dirty line in a search group of the cache is selected for eviction from the cache,
        marking the dirty line as evicted;
        selecting a replacement line from a reserve; and,
        inserting the replacement line into the search group;
        if the eviction is to enable the insertion of new data, storing the new data in the replacement line;
    recovering the organization of the cache on power up following a loss of power to the cache by, for each line in the cache, determining if the line is allocated; and
        if the line is allocated, inserting the line in a search group of the cache; and
        if the line is not allocated, inserting the line into a reserve of cache lines.

12. The tangible machine-readable medium of claim 11 wherein the method further comprises:
    traversing a set in the cache to find lines marked as evicted; and
    for each line found, performing an eviction of the line.

13. The tangible machine-readable medium of claim 12 wherein performing an eviction of the line further comprises
    if the line is marked as dirty, writing back data from the line to disk;
    marking the line as unallocated; and,
    inserting the line into a reserve of cache lines.

14. The tangible machine-readable medium of claim 13 wherein the cache is a disk cache caching data from a disk in a processor based system.

15. The tangible machine-readable medium of claim 14 wherein the method further comprises maintaining the disk in a low power state until writing back data from a line to disk.

16. The tangible machine-readable medium of claim 13 wherein:
    the CATB cache is implemented as a set-associative cache;

each search group of the cache is a set of the cache; and
inserting a line into a search group of the cache further comprises:
using the address of the data as the tag of the line;
performing a modulus operation between the tag and the number of sets (N) in the cache (the tag MOD N) to map the tag to a set of the cache;
performing a search based on the tag of the line; and
inserting the line into a dynamic data structure that represents the set.

17. The tangible, machine readable medium of claim 16 wherein the method further comprises:
recovering the organization of the cache on power up following a loss of power to the cache by, for each line in the cache determining if the line is allocated;
if the line is allocated, inserting the line into a dynamic data structure representing a set of the cache using a mapping based on the tag associated with the line; and
if the line is not allocated, inserting the line into a reserve of cache lines.

18. A tangible machine-readable medium having stored thereon data that when accessed by a machine causes the machine to perform, for a whole number N, in an N-way set associative non-volatile disk cache, a method comprising:
reserving a predetermined number of cache lines to create a reserve of cache lines;
distributing the remaining lines in the cache into N dynamic data structures of approximately the same size;
if a dirty line in a set of the cache is selected for eviction from the cache, marking the dirty line as evicted by modifying metadata associated with the line;
selecting a replacement line from the reserve of cache lines;
if the eviction is to enable insertion of new data, storing the new data in the replacement line; and
inserting the replacement line to a dynamic data structure representing the set;
recovering the organization of the cache on power up following a loss of power to the cache by for each line in the cache
determining if the line is allocated;
if the line is allocated, inserting the line in a set of the cache using a mapping based on the tag associated with the line; and
if the line is not allocated, inserting the line into a dynamic data structure of unallocated lines.

* * * * *

UNITED STATES PATENT AND TRADEMARK OFFICE
CERTIFICATE OF CORRECTION

| | |
|---|---|
| PATENT NO. | : 7,177,983 B2 |
| APPLICATION NO. | : 10/640218 |
| DATED | : February 13, 2007 |
| INVENTOR(S) | : Royer |

It is certified that error appears in the above-identified patent and that said Letters Patent is hereby corrected as shown below:

In column 6, at line 64, delete "whererin" and insert --wherein--.

Signed and Sealed this

Twenty-seventh Day of May, 2008

JON W. DUDAS
*Director of the United States Patent and Trademark Office*